United States Patent
Ajimoto et al.

(10) Patent No.: US 8,620,541 B2
(45) Date of Patent: Dec. 31, 2013

(54) VEHICLE DRIVING-FORCE CONTROL DEVICE

(75) Inventors: Keisuke Ajimoto, Tokyo (JP); Masayuki Nishida, Tokyo (JP); Hiroki Tanaka, Tokyo (JP); Takahito Morishita, Tokyo (JP); Shinya Yasunaga, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 13/308,302

(22) Filed: Nov. 30, 2011

(65) Prior Publication Data

US 2012/0158261 A1 Jun. 21, 2012

(30) Foreign Application Priority Data

Dec. 16, 2010 (JP) ................................. 2010-280668

(51) Int. Cl.
*B60W 10/00* (2006.01)

(52) U.S. Cl.
USPC .......................................................... 701/54

(58) Field of Classification Search
USPC .......................................................... 701/54
See application file for complete search history.

(56) References Cited

U.S. PATENT DOCUMENTS

| | | | | |
|---|---|---|---|---|
| 5,514,046 A | * | 5/1996 | Petersmann et al. | 477/39 |
| 5,730,680 A | * | 3/1998 | Toukura | 477/46 |
| 6,019,701 A | * | 2/2000 | Mori et al. | 477/46 |
| 6,161,427 A | * | 12/2000 | Watanabe et al. | 73/114.24 |
| 6,276,333 B1 | * | 8/2001 | Kazama et al. | 123/399 |
| 7,226,387 B2 | * | 6/2007 | Thompson et al. | 477/107 |
| 7,490,000 B2 | * | 2/2009 | Siddiqui et al. | 701/104 |
| 7,908,065 B2 | * | 3/2011 | Kuwahara et al. | 701/51 |
| 8,301,351 B2 | * | 10/2012 | Kuwahara et al. | 701/65 |
| 2006/0223669 A1 | * | 10/2006 | Thompson et al. | 477/107 |
| 2007/0247975 A1 | | 10/2007 | Masuda et al. | |
| 2007/0255462 A1 | | 11/2007 | Masuda et al. | |
| 2007/0271026 A1 | | 11/2007 | Hijikata | |
| 2007/0299594 A1 | | 12/2007 | Masuda et al. | |
| 2008/0015767 A1 | | 1/2008 | Masuda et al. | |
| 2008/0015768 A1 | | 1/2008 | Masuda et al. | |
| 2008/0097674 A1 | * | 4/2008 | Kuwahara et al. | 701/51 |
| 2008/0162012 A1 | | 7/2008 | Masuda et al. | |
| 2008/0300768 A1 | | 12/2008 | Hijikata | |

FOREIGN PATENT DOCUMENTS

JP 3930529 B1 3/2007
JP 2010-169111 A 8/2010

* cited by examiner

*Primary Examiner* — Mary Cheung
*Assistant Examiner* — Anne Mazzara
(74) *Attorney, Agent, or Firm* — McGinn IP Law Group, PLLC

(57) ABSTRACT

In a vehicle driving-force control device, when a brake switch is turned on, a transmission control unit determines a currently-selected engine mode and sets a deceleration determination value by referring to a determination-value table corresponding to the currently-selected engine mode, using a vehicle speed as a parameter. Then, the transmission control unit compares an absolute value of a deceleration with an absolute value of the deceleration determination value, and shifts down the gear stage if the absolute value of the deceleration exceeds the absolute value of the deceleration determination value.

11 Claims, 5 Drawing Sheets

VEHICLE DRIVING-FORCE CONTROL DEVICE

CROSS-REFERENCE TO RELATED APPLICATIONS

The present application claims priority from Japanese Patent Application No. 2010-280668 filed on Dec. 16, 2010, the entire contents of which are hereby incorporated by reference.

BACKGROUND OF THE INVENTION

1. Field of the Invention

The present invention relates to a vehicle driving-force control device that applies adaptive control of an automatic transmission to control of an engine having at least two engine modes.

2. Description of the Related Art

In the related art, examples of an automatic transmission include a multistage transmission that switches gear ratios in a stepwise manner and a continuously variable transmission that switches gear ratios in a stepless manner. A known representative type of a multistage transmission is a planetary-pinion type. On the other hand, known types of a continuously variable transmission include a belt or chain based type that uses a metallic belt or a metallic chain as a power shift component and a toroidal type that performs a shift operation by changing a contact radius of a power roller relative to a disk.

Shift control of such an automatic transmission is performed by a transmission control unit (TCU). Specifically, the shift control is performed according to a driving state of a vehicle by referring to a shift map that stores a shift characteristic for each gear ratio, on the basis of parameters such as a vehicle speed and a throttle opening for detecting the driving state.

In this case, a technology of performing so-called driving-condition adaptive control (simply referred to as "adaptive control" hereinafter) is also known, as disclosed in, for example, Japanese Unexamined Patent Application Publication No. 2010-169111 (referred to as "Patent Document 1" hereinafter). Specifically, in this adaptive control, the TCU performs upshifting or downshifting or performs a shift hold (that is, fixes a gear ratio) according to the driver's intention when the vehicle accelerates or decelerates, or is running along a curved road.

Since the maximum driving force differs between a fuel efficient vehicle and a high performance vehicle such as a turbo vehicle, the maximum acceleration naturally differs therebetween. Therefore, when driving along a slope with continuous curves, for example, an amount of operation (that is, degree of depression) of a brake pedal and an accelerator pedal also differs between a fuel efficient vehicle and a high performance vehicle.

In another similar known technology, a single vehicle has at least two different driving-force characteristics. In this case, when the driver selects one mode from multiple engine modes, engine output characteristics are switched, and a shift characteristic of the automatic transmission is correspondingly changed. For example, Japanese Patent No. 3930529 (referred to as "Patent Document 2" hereinafter) discloses a technology in which a vehicle has three kinds of mode maps with different engine driving-force characteristics. When the driver selects one of the engine modes, the engine is controlled according to the corresponding mode map, and shift control is performed on the basis of a shift pattern that corresponds to the selected engine mode.

In the technology disclosed in Patent Document 2, the engine modes include three modes, which are a normal mode (referred to as "S mode" hereinafter) suitable for normal driving, a save mode (referred to as "I mode" hereinafter) in which a rise in a target torque is reduced relative to the S mode, and a power mode (referred to as "S# mode" hereinafter) in which a rate of change in the target torque relative to a change in the accelerator opening is set to a large value over substantially the entire driving range.

Specifically, as shown in FIG. 6, in the S mode, the degree of opening of a throttle valve (throttle opening SV) changes substantially linearly with respect to the degree of depression of the accelerator pedal (accelerator opening AP). In other words, the characteristic of the S mode is set similar to that of a naturally aspirated DOHC engine. In the I mode, the characteristic thereof is set so as to be suitable for driving at a low-to-medium speed range since the throttle opening SV does not reach full throttle even when the accelerator pedal is fully pressed. In other words, the characteristic of the I mode is set similar to that of an SOHC engine. In contrast, in the S# mode, the characteristic thereof is set such that the rate of change in the throttle opening SV relative to a change in the accelerator opening AP is set to a large value over the entire driving range. Therefore, the characteristic of the S# mode is set similar to that of a turbo engine, which is suitable for sporty driving in which the engine can exhibit its maximum potential.

Accordingly, in the technology disclosed in Patent Document 2, a single vehicle can exhibit the driving performance of three types of vehicles, which are a normal vehicle (NA vehicle), a fuel efficient vehicle, and a high performance vehicle, depending on the selected engine mode.

In the aforementioned adaptive control, if sudden deceleration due to braking is detected during traveling on a road with continuous curves, for example, the automatic transmission is shifted down to prepare for subsequent acceleration. When releasing of the accelerator pedal is subsequently detected, upshifting is performed based on the assumption that the vehicle will make a turn after braking. If the vehicle is running up a slope, downshifting is performed for achieving acceleration performance.

When this is applied to a vehicle having the aforementioned three engine modes, the braking performance of the vehicle is naturally set so as to assure the driving performance of the S# mode that can exhibit the maximum driving-force performance. Therefore, the adaptive control is also set so as to assure the performance of the S# mode.

In this case, since the driving force in the I mode is limited, as mentioned above, the acceleration performance like that of the S# mode cannot be obtained. Therefore, the I mode does not need to have the braking performance like that of the S# mode. In other words, if a braking force similar to that in the S# mode is exhibited in the I mode, the vehicle speed would rapidly decrease.

Therefore, when the vehicle is running in the I mode, the driver drives the vehicle with a reduced braking force so that the speed of the vehicle entering a road with continuous curves is naturally lower than that in the S# mode. As a result, the speed of the vehicle upon making a turn on a curved road in the I mode is entirely lower than that in the S# mode. Consequently, when braking is detected in such a condition and downshifting is performed by the adaptive control, the driver would feel a sense of sudden deceleration beyond the driver's prediction.

SUMMARY OF THE INVENTION

In view of the circumstances described above, it is an object of the present invention to provide a vehicle driving-force control device that, when the device performs driving-condition adaptive control of a gear ratio of an automatic transmission in a vehicle equipped with an engine having at least two engine modes, can achieve good driving performance in each engine mode so as to reduce a sense of discomfort felt a the driver.

An aspect of the present invention provides a vehicle driving-force control device including a mode selecting unit, an engine control unit, a shift control unit, and an adaptive control unit. The mode selecting unit selects one engine mode from at least two engine modes having different engine driving-force characteristics. The engine control unit controls an engine according to the one engine mode selected by the mode selecting unit. The shift control means performs shift control of an automatic transmission according to a driving state of a vehicle. The adaptive control unit compares a deceleration of the vehicle with a preset deceleration determination value and outputs a downshift command to the automatic transmission if the deceleration is greater than the deceleration determination value. The adaptive control unit includes the deceleration determination value for each of the engine modes.

DESCRIPTION OF THE PREFERRED EMBODIMENTS

Figure 1:
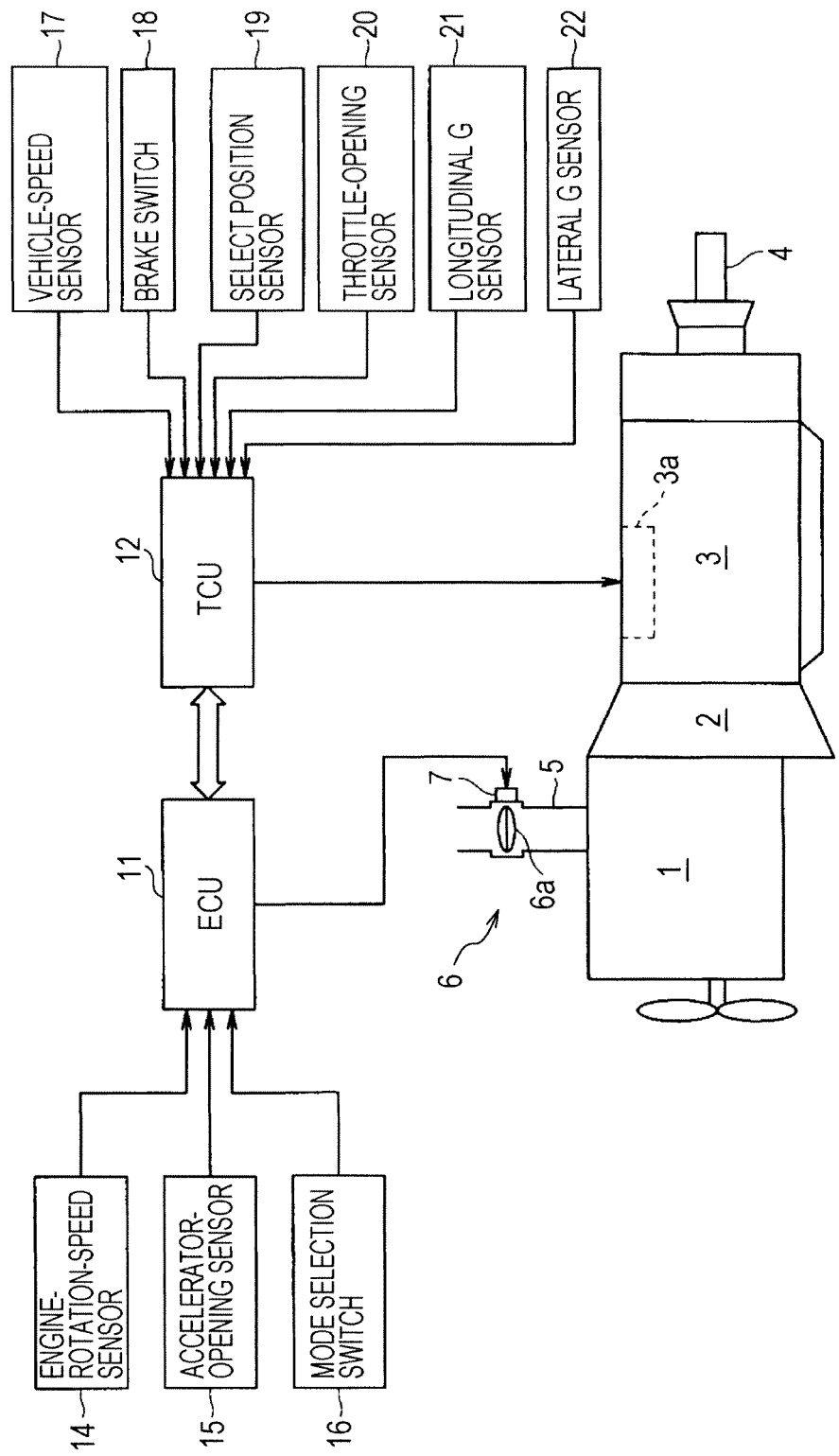
FIG. 1 illustrates a system configuration of an engine and an automatic transmission.

An embodiment of the present invention will be described below with reference to the drawings. Reference numeral 1 in FIG. 1 denotes an engine. An automatic transmission 3 is coupled to an output side of the engine 1 via a torque converter 2. An output from the engine 1 is transmitted to the automatic transmission 3 via a fluid in the torque converter 2 or via a lock-up clutch (not shown) when in a locked-up state. In the case of a multistage transmission, the automatic transmission 3 shifts a gear to a predetermined gear stage. In the case of a continuously variable transmission, the automatic transmission 3 shifts a gear to a predetermined gear ratio. Subsequently, the output is transmitted from an output shaft 4 toward driving wheels, such as rear wheels or front wheels, so that a driving force is generated. The following description is directed to an example in which the automatic transmission 3 is a multistage transmission. In the case of a continuously variable transmission, the term "gear stage" may be changed to the term "gear ratio".

An electronic throttle controller (ETC) 6 is disposed at an intermediate section of an intake passage 5 that communicates with an intake port (not shown) of the engine 1. The ETC 6 has a throttle actuator 7 that opens and closes a throttle valve 6a. The throttle actuator 7 is driven in response to a drive signal from a later-described engine control unit (ECU) 11 serving as an engine control unit of the present invention.

The automatic transmission 3 includes a transmission mechanism constituted of planetary pinions, and a friction fastener formed of a clutch, a brake, and the like that appropriately drives this transmission mechanism.

Furthermore, the automatic transmission 3 is provided with a control valve unit 3a that performs a fastening or releasing operation of the friction fastener as well as a releasing or connecting operation of the lock-up clutch provided in the torque converter 2. The control valve unit 3a is activated in response to a transmission command (downshift command or upshift command) signal from a later-described transmission control unit (TCU) 12 serving as a shift control unit of the present invention.

Each of the ECU 11 and the TCU 12 is a microcomputer equipped with a CPU, a ROM, a RAM, and a nonvolatile memory and such as an EEPROM. The ECU 11 and the TCU 12 are connected with each other via a bus line so as to allow communication therewith.

An input side of the ECU 11 is connected to various sensors that detect parameters required for engine control. Examples of such sensors include an engine-rotation-speed sensor 14 that detects an engine rotation speed Ne (rpm) from a rotation speed of an output shaft of the engine 1, an accelerator-opening sensor 15 that detects an accelerator opening AP (%) indicating how much an accelerator pedal (not shown) is depressed, and a mode selection switch 16 serving as a mode selecting unit of the present invention. An output side of the ECU 11 is connected to the throttle actuator 7 of the ETC 6.

The ECU 11 sets a target torque as a driving-force instruction value by performing map searching using the engine rotation speed Ne and the accelerator opening AP as parameters, and sets a throttle opening SV corresponding to the thus set target torque. Then, the ECU 11 performs feedback control on the throttle actuator 7 such that the throttle opening SV of the throttle valve 6a is equal to a target throttle opening.

In this embodiment, a target torque map used for setting the target torque is set for each preset output characteristic (engine mode). A driver can select any one of the engine modes by operating the mode selection switch 16. As is the case with Patent Document 2 described above, the engine modes in this embodiment include three modes, which are a normal mode (S mode), a save mode (I mode), and a power mode (S# mode). Since the S, I, and S# engine modes have different engine-driving-force characteristics, a target torque map is provided for each engine mode.

Figure 6:
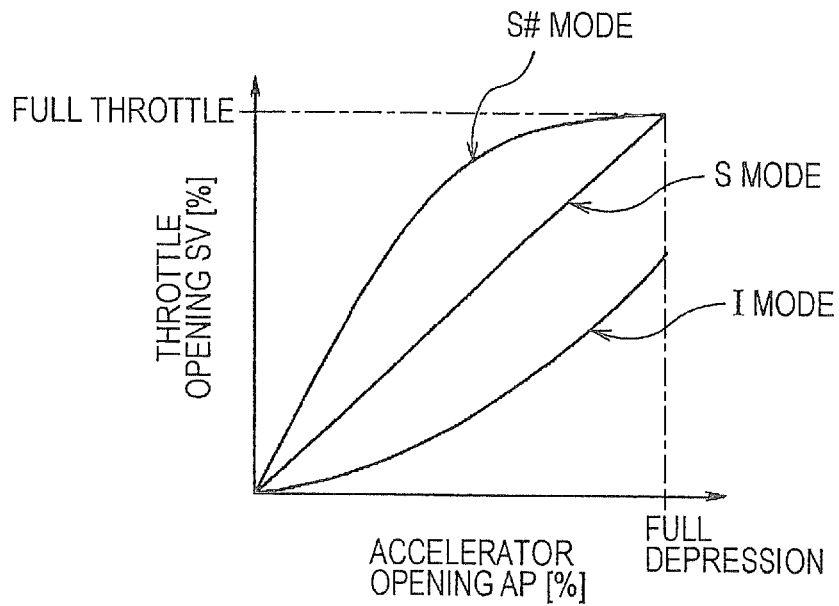
FIG. 6 is a characteristic diagram illustrating the relationship between an accelerator opening and a throttle opening for each engine mode.

The characteristics of the target torque maps for the respective engine modes will now be briefly explained. An S-mode target torque map (referred to as "S-mode map" hereinafter) has a characteristic in which the target torque changes substantially linearly with respect to the accelerator opening AP, and is set so as to achieve comfortable driving. An I-mode target torque map (referred to as "I-mode map" hereinafter) is set such that a rise in the target torque is suppressed as compared with the aforementioned S-mode map, so as to achieve both comfortable driving and high fuel economy in a well-balanced manner in a low-to-medium speed range. An S#-mode target torque map (referred to as "S#-mode map" hereinafter) is set such that the rate of change in the target torque relative to a change in the accelerator opening AP is increased over substantially the entire driving range, whereby the engine 1 can exhibit its maximum potential. The relationship between the accelerator opening AP and the throttle opening SV in each of the S, I, and S# modes is schematically shown in FIG. 6.

An input side of the TCU 12 is connected to various sensors and switches that detect parameters required for shift control. Examples of such sensors and switches include a vehicle-speed sensor 17 that detects a vehicle speed Vsp on the basis of a rotational speed of the output shaft 4 of the automatic transmission 3, a brake switch 18 that outputs an ON signal in response to depression of a brake pedal (not shown), a select position sensor 19 that detects a set position of a select lever, a throttle-opening sensor 20 that detects the opening (throttle opening) SV of the throttle valve 6a, a longitudinal-acceleration (longitudinal G) sensor 21 that detects longitudinal acceleration Gx of the vehicle, and a lateral-acceleration (lateral G) sensor 22 that detects lateral acceleration Gy of the vehicle. Furthermore, an output side of the TCU 12 is connected to actuators provided in the control valve unit 3a.

Figure 4:
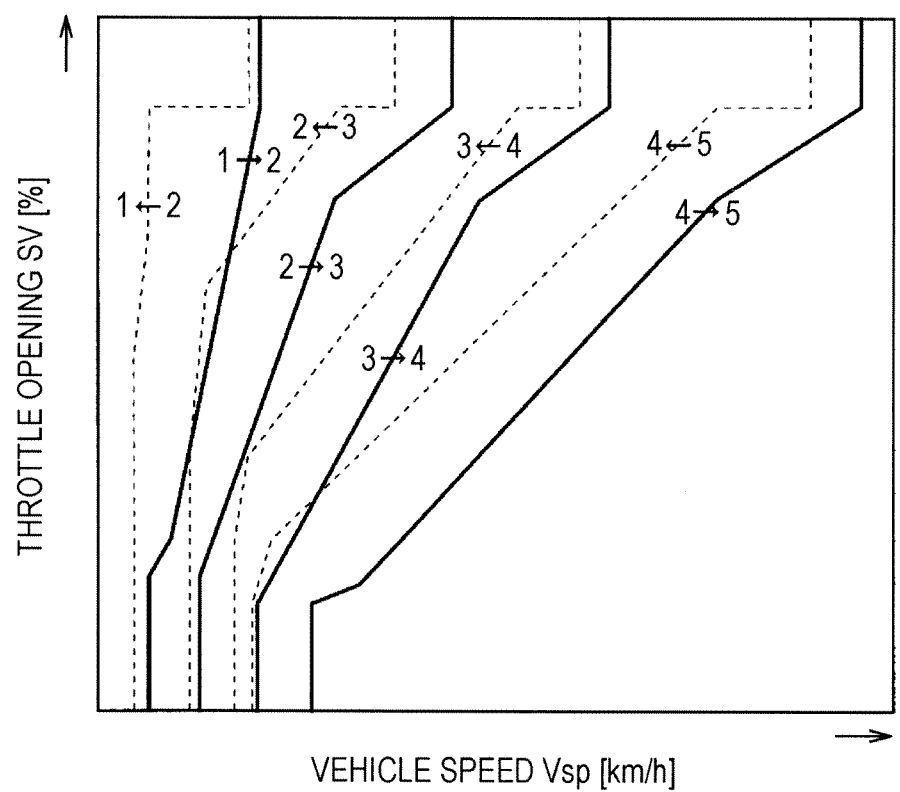
FIG. 4 illustrates a shift map.

The TCU 12 performs shift control for setting an optimal gear stage by referring to a shift map using the vehicle speed Vsp and the throttle opening SV as parameters. FIG. 4 illustrates an example of the shift map. In FIG. 4, upshift lines are denoted by solid lines, whereas downshift lines are denoted by dotted lines. In the shift map shown in FIG. 4, the upshift lines are disposed at the higher speed side relative to the downshift lines so as to provide hysteresis, thereby preventing control hunting during shifting. This shift map is set by previously obtaining a shift schedule suitable for the output characteristics of the engine 1 for each of the aforementioned S, I, and S# modes from an experiment or the like. Since the shift control is similar to that in the related art, a detailed description thereof is omitted.

When the vehicle rapidly decelerates in response to depression of the brake pedal, the TCU 12 performs braking downshift control as adaptive control for shifting down the gear stage of the automatic transmission 3. In this braking downshift control, downshifting is performed at a timing corresponding to any one of the S, I, or S# engine mode selected by the driver (a detailed description will be given hereinbelow).

Figure 2:
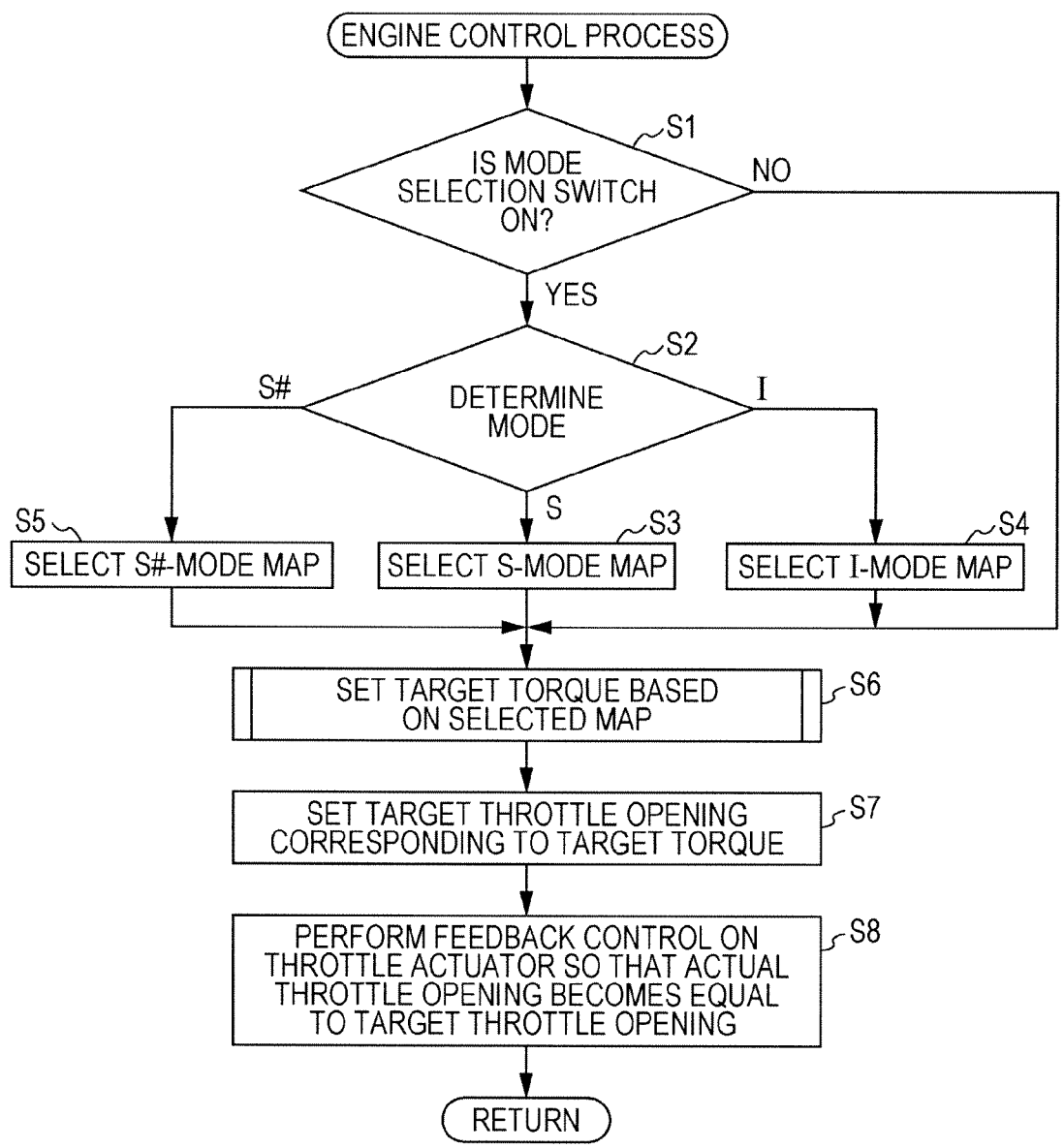
FIG. 2 is a flowchart illustrating an engine control routine.

The aforementioned engine control in the ECU 11 is performed according to an engine control routine shown in FIG. 2. The braking downshift control in the TCU 12 is performed according to a braking downshift control routine shown in FIG. 3.

First, the engine control routine shown in FIG. 2 will be described. This routine is performed at every predetermined calculation cycle. In step S1, it is determined whether or not the mode selection switch 16 has been operated by the driver. If the mode selection switch 16 has not been operated, the process proceeds to step S6. If it is detected that the mode selection switch 16 has been operated, the process proceeds to step S2.

In step S2, it is determined which one of the S, I, and S# engine modes has been selected by the driver via the mode selection switch 16. If it is determined that the S mode has been selected, the process proceeds to step S3. If it is determined that the I mode has been selected, the process proceeds to step S4. If it is determined that the S# mode has been selected, the process proceeds to step S5.

When the process proceeds to any one of steps S3 to S5, the corresponding mode map (S, I, or S#) is read from the nonvolatile memory in the ECU 11 so as to be selected as a current mode map. The process then proceeds to step 56.

When the process proceeds to step S6 from step S1 or from any one of steps S3 to S5, a target torque τe is set on the basis of the selected mode map using the engine rotation speed Ne and the accelerator opening AP as parameters. Then, the process proceeds to step S7 where a target throttle opening SVo corresponding to the target torque τe is set.

Subsequently, in step S8, the throttle opening SV detected by the throttle-opening sensor 20 is read, and the degree of opening of the throttle valve 6a is feedback-controlled by controlling the throttle actuator 7 provided in the ETC 6 such that the throttle opening SV matches the target throttle opening SVo. The process then exits the routine.

As mentioned above, the engine 1 according to this embodiment has three engine modes, which are S mode, I mode, and S# mode, and the driver can drive the vehicle while selecting the preferred mode. When the TCU 12 detects deceleration in response to braking operation, the TCU 12 performs the braking downshift control as adaptive control for automatically shifting down the current gear stage according to the deceleration.

In this case, if the downshift characteristic of the braking downshift control is set on the basis of the S# mode independently of the S, I, or S# engine mode selected by the driver, the downshift timing in he I mode tends to be too early. This not only leads to higher fuel consumption due to more frequent downshifting, but also to a large decrease in the engine rotation speed due to excessive downshifting, thereby giving the driver a sense of discomfort. If the downshift characteristic is set on the basis of the I mode, the downshift timing in the power-oriented S# mode tends to be delayed, thereby causing the driver to feel a lack of torque.

On the other hand, in the S mode, whether the downshift characteristic is set on the basis of the S# mode or the I mode, the downshift timing tends to be too early in the downshift characteristic set on the basis of the S# mode, or the downshift timing tends to be delayed in the downshift characteristic set on the basis of the I mode. In either case, it is difficult to achieve good driving performance.

Therefore, in the TCU 12 according to this embodiment, the downshift characteristic during braking is set such that the downshift timing is set early for the S# mode and set late for the I mode, and the braking downshift control is prohibited in the S mode, whereby good driving performance can be achieved.

The term "deceleration" refers to a negative value of acceleration. Specifically, a vehicle speed per time decreases as deceleration increases.

The braking downshift control performed by the TCU 12 will be described below according to the braking downshift control routine shown in FIG. 3. The process of this routine corresponds to an adaptive control unit of the present invention.

This routine is activated in response to an ON signal from the brake switch 18 as a trigger signal. Specifically, the TCU 12 monitors depressing of the brake pedal by the driver, and when the TCU 12 detects that the brake pedal has been depressed, the TCU 12 activates the braking downshift control routine. First, in step S11, the engine mode is read. In step 512, it is determined whether the current engine mode is set in the S mode, the I mode, or the S# mode. If it is determined that the current engine mode is set in the S mode, the process proceeds to step S18. If it is determined that the current engine mode is set in the I mode, the process proceeds to step S13. If it is determined that the current engine mode is set in the S# mode, the process proceeds to step S14.

In the case where the process proceeds to step S13, a deceleration determination value Dn is set by referring to an I-mode deceleration-determination-value table using the current gear stage and the vehicle speed Vsp as parameters, and the process then proceeds to step S15. On the other hand, in the case where the process proceeds to step S14, a deceleration determination value Dn is set by referring to an S#-mode deceleration-determination-value table using the current gear stage and the vehicle speed Vsp as parameters, and the process then proceeds to step S15.

Figure 5:
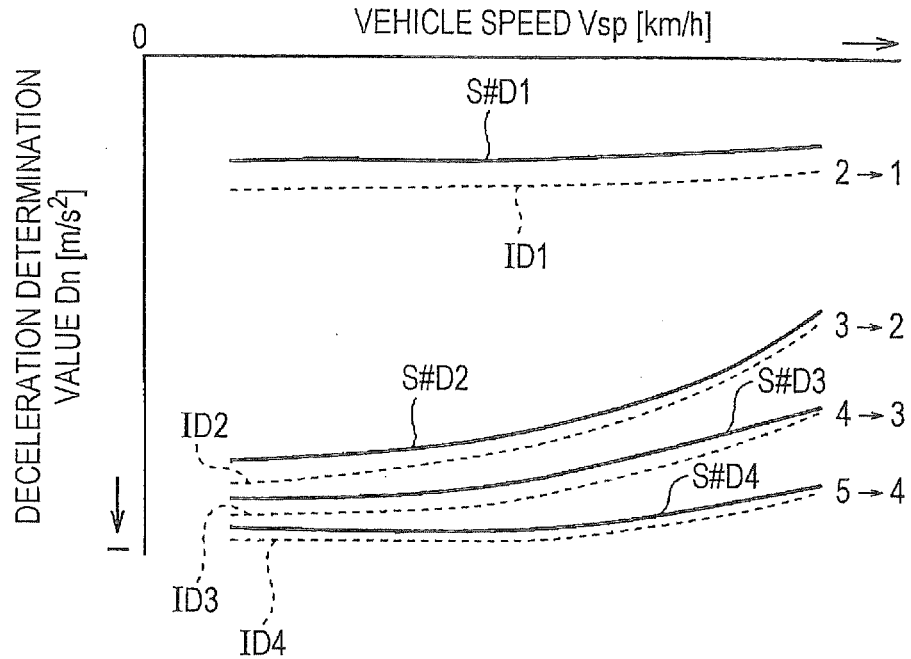
FIG. 5 illustrates deceleration-determination-value tables for respective modes.

In FIG. 5, downshift determination lines S#D1 to S#D4 for respective gear stages stored in the S#-mode deceleration-determination-value table are denoted by solid lines, whereas downshift determination lines ID1 to ID4 for respective gear stages stored in the I-mode deceleration-determination-value table are denoted by dotted lines.

As shown in FIG. 5, the downshift determination lines set in both deceleration-determination-value tables are set such that downshifting is performed at a lower deceleration as the vehicle speed Vsp increases. Specifically, downshifting is performed at a lower deceleration as the gear stage is located more toward the lower stage side. Furthermore, the downshift determination lines (solid lines) for respective gear stages stored in the S#-mode deceleration-determination-value table are set at the lower deceleration side compared to the downshift determination lines (dotted lines) for respective gear stages stored in the I-mode deceleration-determination-value table.

Therefore, in this embodiment, the I mode and the S# mode have different braking downshift timings, such that the downshift control in the S# mode is performed at a relatively earlier timing than in the I mode. For this reason, the vehicle runs at a relatively high engine rotation speed in the S# mode, thereby achieving good acceleration performance when the vehicle exits a curved road. On the other hand, in the I mode with lower acceleration performance than that of the S# mode, the downshift timing is late compared to the S# mode and thus engine braking does not become excessive, thereby preventing a sharp decrease in the vehicle speed.

Subsequently, when the process proceeds to step S15 from step S13 or S14, the deceleration determination value Dn set in step S13 or S14 is compared with a deceleration D (m/s$^2$) obtained on the basis of the time derivative or the like of the vehicle speed Vsp. If it is determined that the deceleration D is greater than the deceleration determination value Dn, the process proceeds to step S16. If it is determined that the deceleration D is smaller than the deceleration determination value Dn, the process branches to step S18.

When the process proceeds to step S18 from step S12 or S15, the braking downshift control is prohibited, and the process exits the routine. Accordingly, when the engine mode is set in the S mode, downshifting is not performed even in the case of sudden braking by the driver. Instead, the normal shift control simply performed, and thus excessive engine braking is prevented, thereby achieving comfortable driving performance.

On the other hand, when the process proceeds to step S16 from step S15, a gear stage lower by one stage than the current gear stage is set as a target gear stage. Subsequently, in step S17, a downshift command corresponding to the target gear stage is output to the control valve unit 3a, and the process then exits the routine. The control valve unit 3a shifts down the gear stage of the automatic transmission 3 to the target gear stage according to the downshift command from the TCU 12.

Accordingly, the braking downshift control according to this embodiment adapts to the S, I, and S# engine modes controlled by the ECU 11. Specifically, when the engine mode is in the S mode, the braking downshift control is prohibited, or when the engine mode is in the I mode or the S# mode, a deceleration determination value Dn according to the corresponding mode is set. Therefore, when the vehicle runs in the S# mode, downshifting is performed at an early timing, and thus the vehicle runs with a higher engine rotation speed, thereby preventing a lack of torque and achieving good driving performance. On the other hand, since the downshift timing is set to a later timing for the I mode, downshifting is performed less frequently, thereby preventing not only high fuel consumption, but also a sharp decrease in the vehicle speed caused by downshifting.

As a result, good adaptive control (braking downshift control) reflecting the driver's intention can be achieved for all of the engine modes, that is, the S mode, the I mode, and the S# mode, thereby reducing a sense of discomfort felt by the driver.

The present invention is not to be limited to the above-described embodiment. For example, a deceleration determination value Dn based on the vehicle speed Vsp may also be set also for the S mode. In that case, the deceleration determination value Dn for the S mode is set to a value between the deceleration determination value Dn set for the I mode and the deceleration determination value Dn set for the S# mode. Furthermore, the engine modes may be modes other than the aforementioned three kinds, that is, the S mode, the I mode, and the S# mode. In that case, a deceleration determination value Dn corresponding to each of the modes is set.

Figure 3:
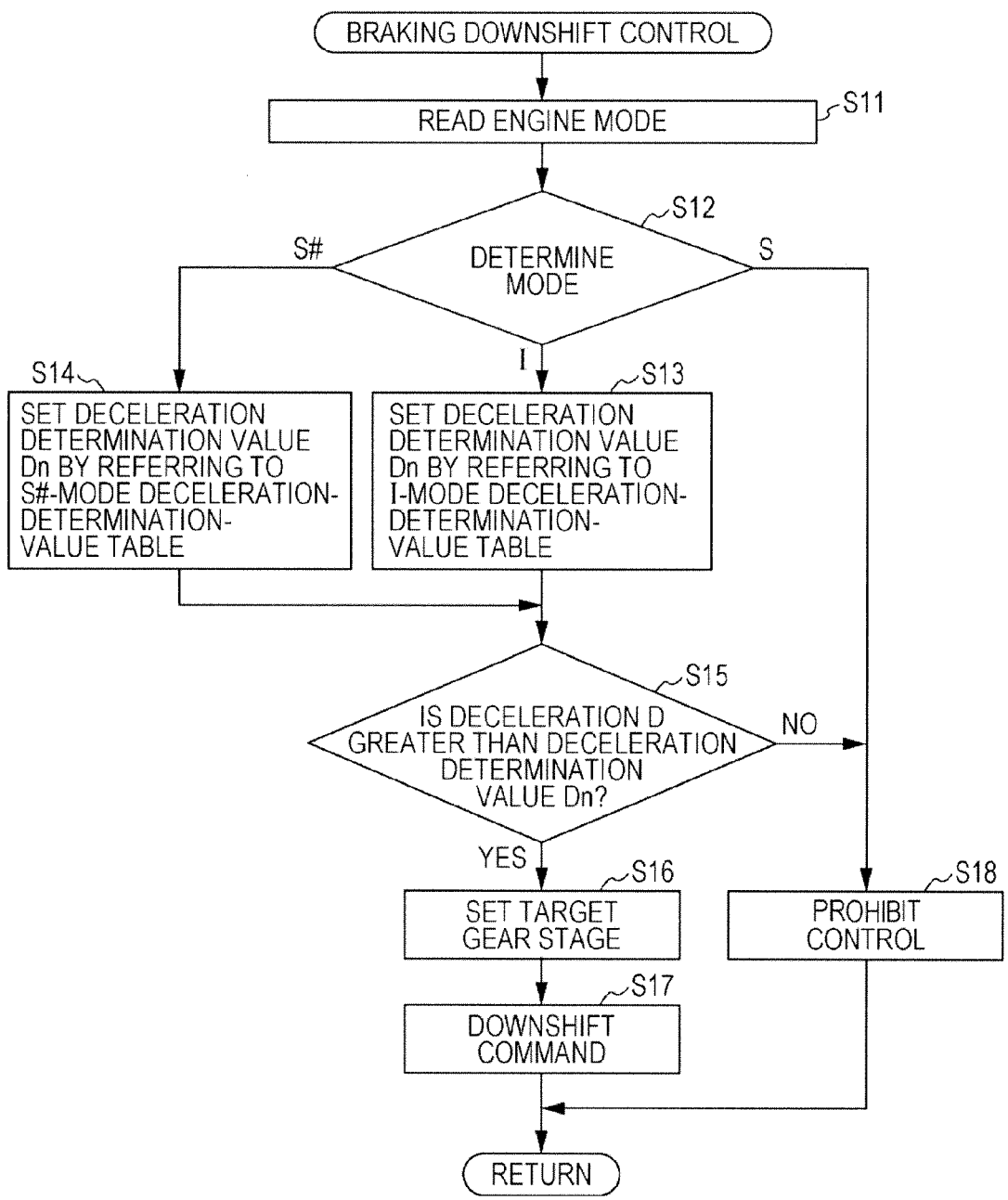
FIG. 3 is a flowchart illustrating a braking downshift control subroutine.

As a further alternative, in the aforementioned step S12 in the braking downshift control routine shown in FIG. 3, a determination process may be performed only for the I mode and the S# mode. With regard to the S mode in that case, the same control can be achieved by simply ending the routine.

What is claimed is:

1. A vehicle driving-force control device comprising:
   a mode selecting unit that selects one engine mode from at least two engine modes having different engine driving-force characteristics;
   an engine control unit that controls an engine according to the one engine mode selected by the mode selecting unit, the engine control unit includes a target torque corresponding to the one engine mode selected and a target throttle opening corresponding to the target torque;
   a shift control unit that performs shift control of an automatic transmission according to a driving state of a vehicle; and
   an adaptive control unit that compares a deceleration of the vehicle with a preset deceleration determination value, sets a target gear stage which is one stage less than a current gear stage, and outputs a downshift command to the automatic transmission corresponding to the target gear stage if the deceleration is greater than the deceleration determination value,
   wherein the adaptive control unit includes the deceleration determination value for each of the engine modes.

2. The vehicle driving-force control device according to claim 1,
   wherein the engine modes include a save mode in which a rise in the target torque is suppressed and a power mode in which a rate of change in the target torque is set to a large value, and
   wherein the adaptive control unit sets the deceleration determination value for the power mode to a smaller deceleration value than the deceleration determination value for the save mode.

3. The vehicle driving-force control device according to claim 2, wherein the engine modes further include a normal mode in which the target torque changes linearly, and
   wherein the adaptive control unit prohibits adaptive control when the adaptive control unit determines that the normal mode is selected as the one engine mode.

4. The vehicle driving-force control device according to claim 1, wherein the engine control unit further includes an engine-rotation-speed detection unit that detects an engine rotation speed from a rotation speed of an output shaft of the engine.

5. The vehicle driving-force control device according to claim 4, wherein the engine control unit further includes an accelerator-opening detection unit that detects an amount of accelerator-opening.

6. The vehicle driving-force control device according to claim 5, wherein the target torque is set to a driving-force instruction value by performing map searching using the engine-rotation-speed and the accelerator-opening as parameters, and sets a throttle-opening corresponding to the target torque.

7. The vehicle driving-force control device according to claim 6, wherein the engine control unit performs feedback control on a throttle actuator such that the throttle-opening of a throttle valve is equal to the target throttle-opening.

8. The vehicle driving-force control device according to claim 1, wherein the vehicle comprises a brake pedal and the adaptive control unit further includes a break switch configured so as to output an ON signal in response to a depression of the brake pedal.

9. The vehicle driving-force control device according to claim 1, wherein the adaptive control unit further includes a vehicle-speed sensor that detects a speed of an output shaft of the automatic transmission.

10. The vehicle driving-force control device according to claim 1, wherein the vehicle comprises a select lever and the adaptive control unit further includes a select position sensor that detects a position of the select lever.

11. A method for vehicle driving-force control comprising:
    selecting an engine mode from a plurality of engine modes having different engine driving-force characteristics;
    controlling an engine according to the selected engine mode;
    setting a target torque corresponding to the selected engine mode;
    setting a target throttle opening corresponding to the target torque;
    performing shift control of an automatic transmission according to a driving state of a vehicle;
    comparing a deceleration of the vehicle with a preset deceleration determination value;
    setting a target gear stage which is less than a current gear stage; and
    outputting a downshift command to the automatic transmission corresponding to the target gear stage if the deceleration is greater than the deceleration determination value.

* * * * *